Patented Mar. 24, 1942

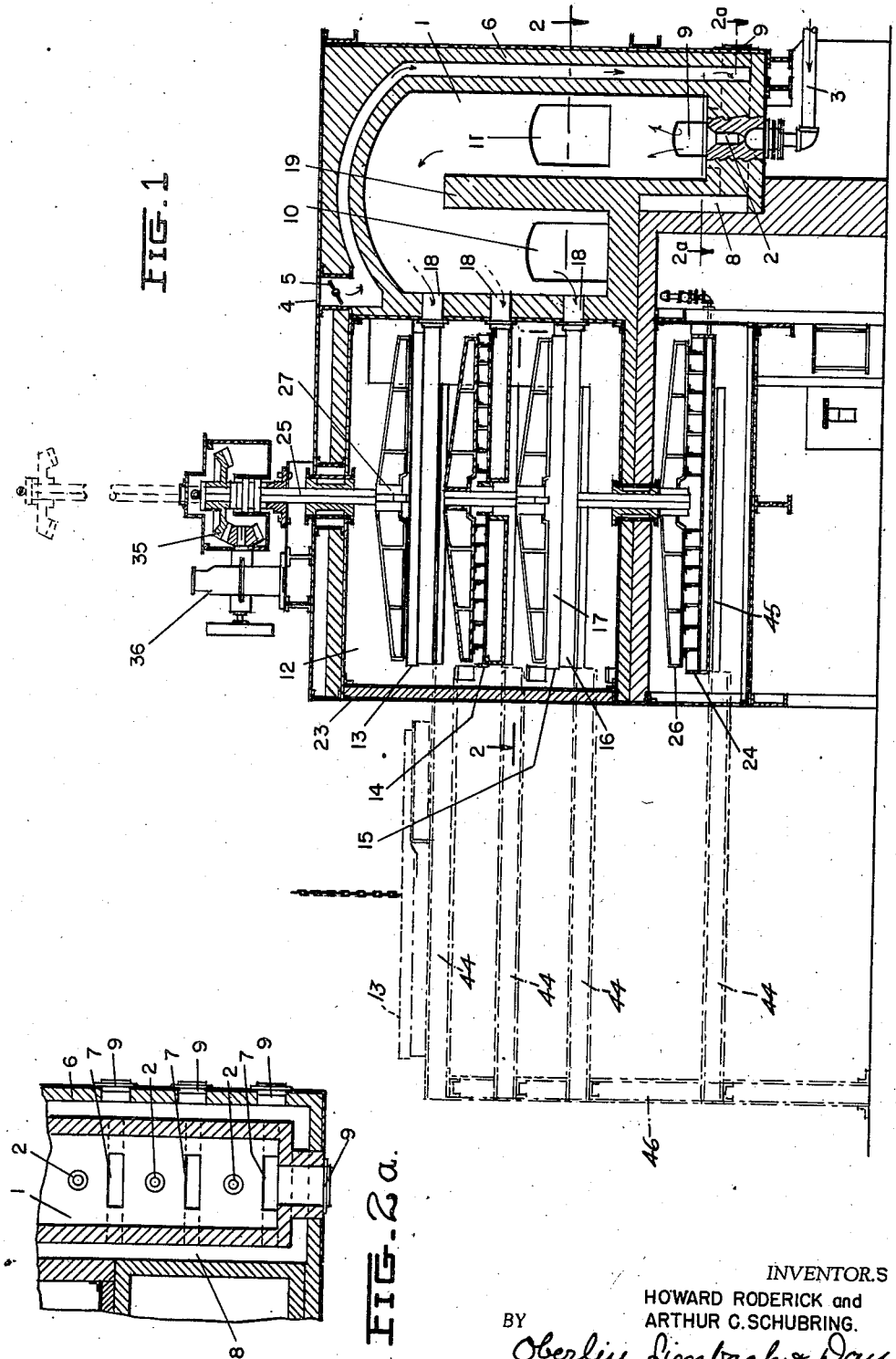

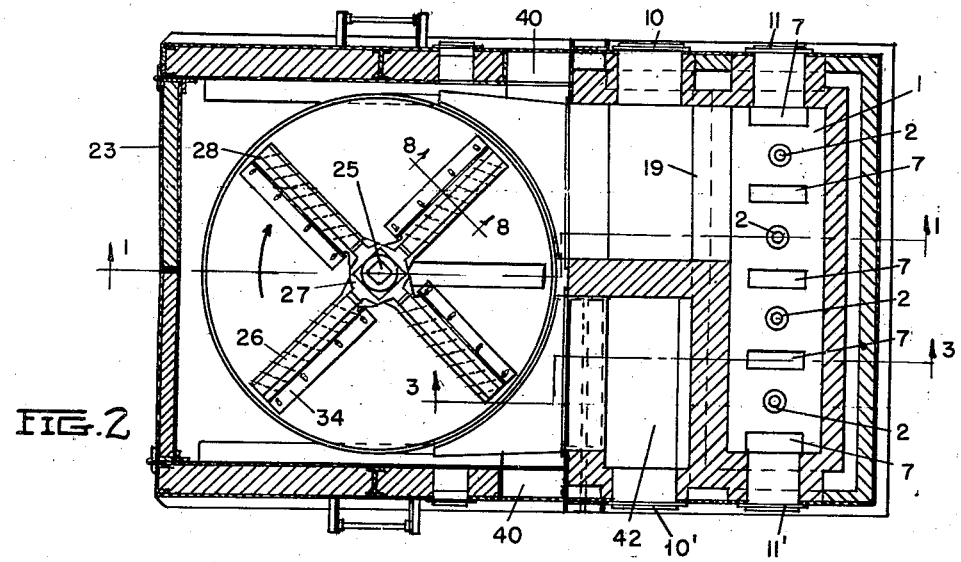
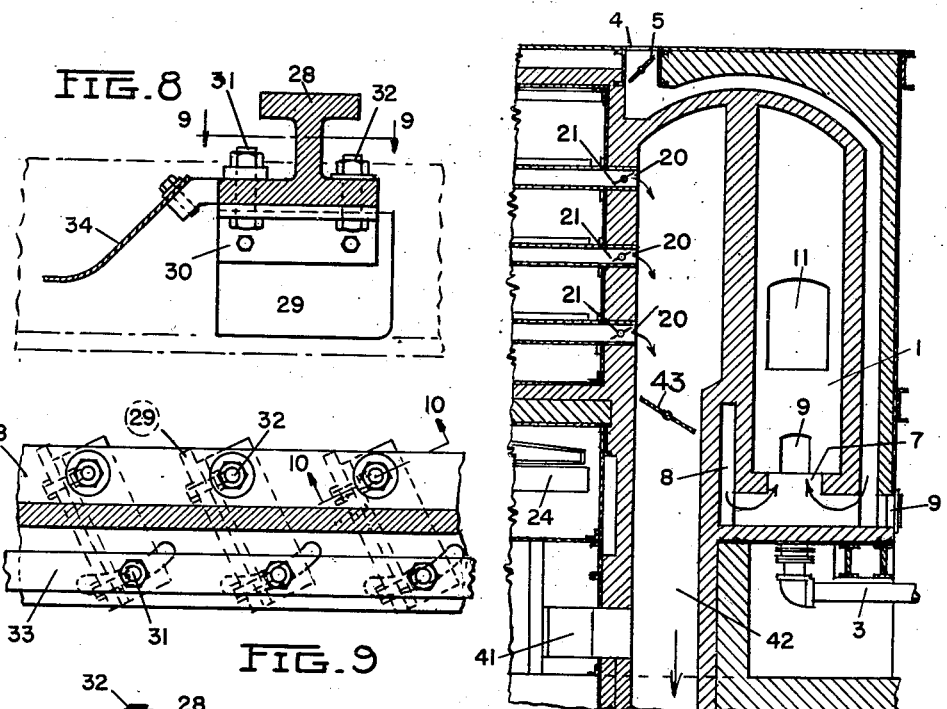
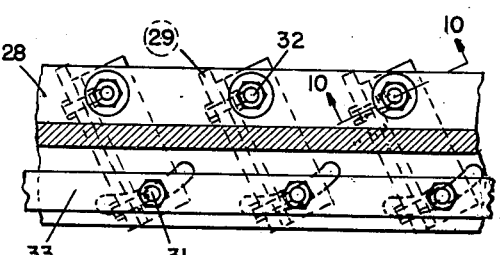
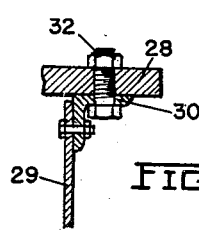

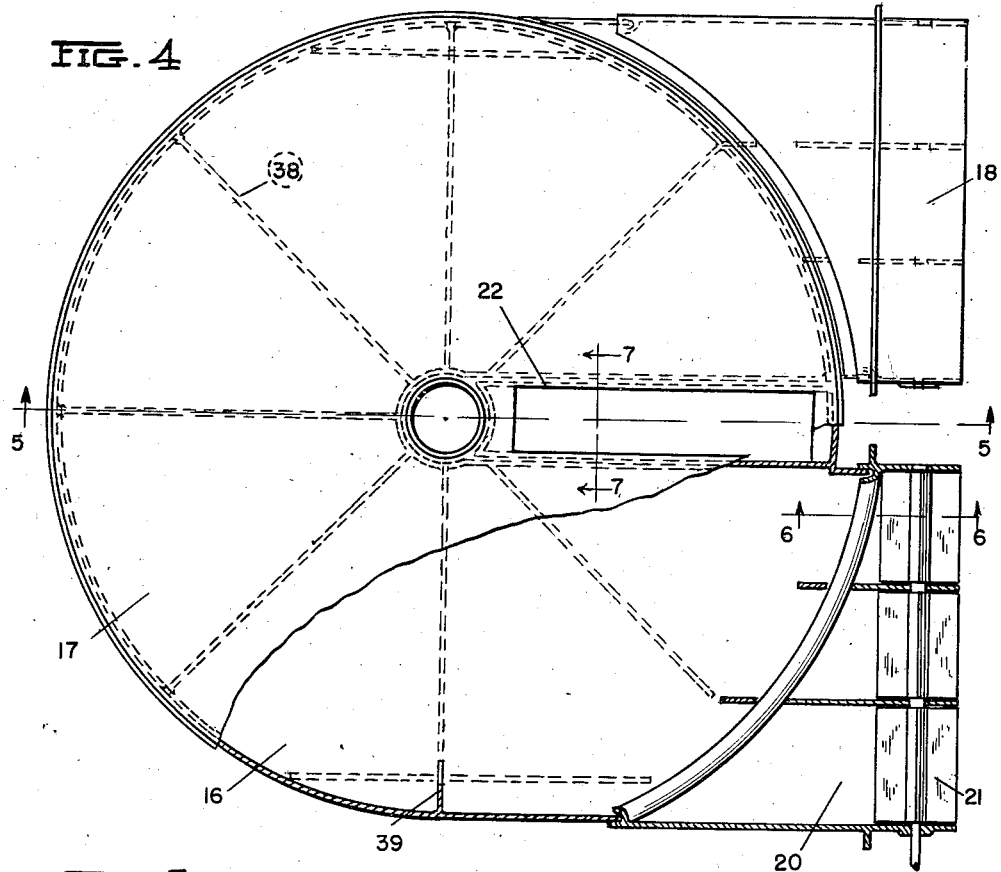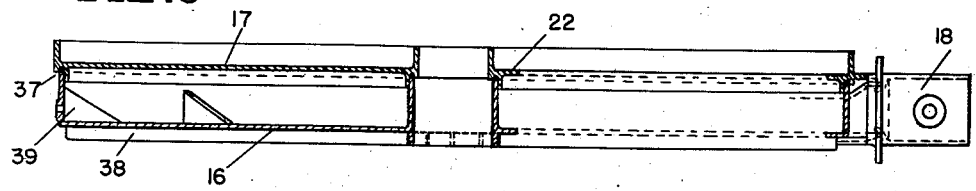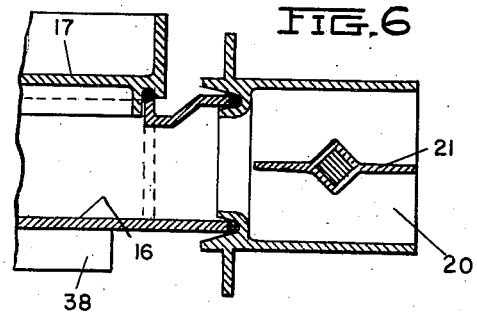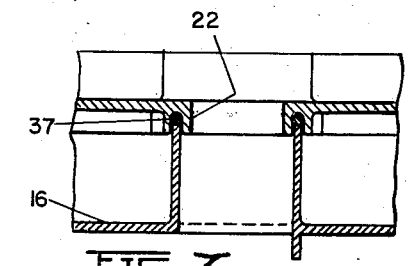

2,277,355

UNITED STATES PATENT OFFICE 2,277,355

CHEMICAL REACTION FURNACE

Howard Roderick, Grosse Ile, and Arthur C. Schubring, Trenton, Mich., assignors to Michigan Alkali Company, Wyandotte, Mich., a corporation of Michigan Application September 9, 1939, Serial No. 294,155

3 Claims. (Cl. 263—26)

This invention relates, as indicated, to furnaces and, more particularly, to furnaces adapted to promote certain types of chemical reactions under the most advantageous conditions.

Certain types of chemical reactions, including many which are exothermic in character, may be inaugurated and promoted by heating the reactant materials. It is generally highly desirable that certain maximum and minimum temperatures be observed in order that the reaction may be properly controlled. Also, in many cases, it is highly desirable that the products of combustion should not come into contact with the materials being treated. As a result, many reactions are carried out as a batch process rather than a continuous process with considerable loss of time and increased handling costs.

It is, therefore, a primary object of this invention to provide a furnace for heating reactant materials to obtain their controlled chemical reaction, such furnace being adapted for continuous operation, without such materials coming into contact with the products of combustion.

Another object of this invention is to provide a furnace of the above type in which parts may be readily inspected and replaced as needed.

A further object is to provide a furnace adjustable to heat the materials to be treated to different temperatures at different stages of their passage therethrough.

Still another object of this invention is to provide an improved process of treating materials, particularly in the production of granular sodium orthosilicate, whereby their reaction is promoted at the desired temperatures and the product continuously discharged in condition for transportation and use.

Other objects of this invention will appear as the description proceeds.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings, Fig. 1 is an elevational cross-sectional view of our new furnace taken along the line 1—1 on Fig. 2;

Fig. 2 is a horizontal cross-sectional view taken along the line 2—2 on Fig. 1;

Fig. 2a is a fragmentary horizontal cross-sectional view taken along the line 2a—2a on Fig. 1;

Fig. 3 is a fragmentary cross-sectional elevational view of the fuel combustion chamber and associated elements taken along the line 3—3 on Fig. 2;

Fig. 4 is a top view partly in cross-section of one of the trays employed in the furnace of this invention and showing the hot gas inlets and outlets;

Fig. 5 is a cross-sectional view of such tray taken along the line 5—5 on Fig. 4;

Fig. 6 is a fragmentary cross-sectional view showing the damper used to regulate the flow of hot gases, taken along the line 6—6 on Fig. 4;

Fig. 7 is a fragmentary cross-sectional view taken on the line 7—7 in Fig. 4 across the discharge slot in the tray;

Fig. 8 is a cross-sectional view of one of the agitator arms taken on the line 8—8 in Fig. 2;

Fig. 9 is a fragmentary cross-sectional view taken along the line 9—9 on Fig. 8; and Fig. 10 is a cross-sectional view of a portion of such arm along the line 10—10 on Fig. 9 including one of the plows attached thereto.

Referring now more particularly to said annexed drawings and especially Figs. 1, 2 and 3, one embodiment of the furnace of our invention comprises a fuel combustion chamber 1 lined with fire brick and containing four gas burners 2 of the tunnel type. The mixture of gas and air supplied by the pipes 3 is adjusted so that relatively little excess air is required. Secondary air is induced through an opening 4 controlled by a damper 5 and is conducted within the wall 6 of chamber 1 to ports 7 on either side of said burners as indicated by the arrows in Fig. 1. This double walled portion extends around the ends of chamber 1 and across the lower portion of the inner side of said chamber forming a cross passage 8 best shown in Figs. 1 and 2a so that the secondary air may be brought to the ports 7 from both sides. Additional secondary air may be drawn in through side openings 9 if desired.

The interior of the chamber 1 may be inspected and repairs or replacements effected by men entering through the doors 10 and 11 or 10' and 11' when the furnace is shut down.

In an insulated enclosure 12 adjacent said chamber is located a series of vertically spaced, horizontally disposed trays 13, 14 and 15. Each of said trays comprises a hollow lower portion 16 and a rimmed upper portion 17 adapted to bear the materials being treated. The precise construction is described in greater detail below.

The lower hollow portions of said trays communicate with the combustion chamber 1 by means of inlets 18, the hot gases passing over the baffle 19 as indicated by the arrows, entering the trays by said inlets and leaving by way of the damper controlled ports 20 which lead to the stack (not shown). The dampers 21 in said ports may be manually or thermostatically controlled and by their regulation the temperature of each tray may be individually determined. Dampers may also be employed in inlets 18 if desired. A port or slot 22, as best shown in Figs. 2, 4 and 5 passes through each tray and its side walls act as baffles in the hollow portion of the tray to ensure circulation of the heating gases.

Insulated doors 23 to said enclosure may be opened for inspection or removal of said trays and their associated parts, supporting beams 44 being positioned as indicated in dot and dash line in Fig. 1 on which the trays may be drawn out. The upper of the series of trays is shown as thus withdrawn, in dotted outline in Fig. 1. This makes for quick and inexpensive repairs and replacements instead of the long shut-downs usually required to repair a furnace or other heating unit. The trays are supported within the enclosure on angle iron side brackets such as 45 and the ends of the beams 44 are adapted to be inserted within the enclosure to abut against the ends of such bracket members. The other ends of such beams are removably supported upon brackets carried by uprights such as upright 46.

Without said enclosure and beneath said series of trays is still another tray 24 of generally similar design to those just described but of welded steel construction adapted to be cooled by the circulation of water in the lower hollow portion thereof.

Passing centrally through said series of trays and terminating just above the lowermost tray 24 is a rotatable, vertically mounted drive shaft 25 of square cross-section. Agitators 26, one for each tray, are axially slidably connected to said shaft for rotation therewith.

The construction of said agitators is best shown in Figs. 2, 8, 9, 10 and in the cross-sections of trays 14 and 24 in Fig. 1. Each will be seen to comprise a cast iron hub 27 to which radially extending cast iron arms 28 are attached. To the bottom of each arm are attached nine blades or plows 29 by means of angle clips 30 and bolts 31 and 32. All blades are pivoted about the front bolt 32 and the setting of the blades may be adjusted to any desired pitch between 0° and 45° to the line of travel. All blades on any one arm are generally held at the same angle by means of a connecting arm 33. The blades on alternate arms are given a pitch in opposite directions so that the material will be pushed first in one direction and then the other to secure thorough agitation.

On the trailing side of each arm is attached a spreader plate 34 to level the material after the plow blade has passed through. It also aids in advancing the material somewhat in its travel around the tray. Its height above the tray is adjustable.

The agitator hub 27 fits loosely about the square drive shaft 25 and its weight rests at all times upon the upper surface of the tray. As the depth of the blades 29 is worn away the operation of the agitator is not affected until said blades are entirely worn down at which time they may be renewed.

When it becomes necessary or desirable to remove a tray or agitator from the insulated enclosure 12 the drive shaft 25 is withdrawn as indicated in dash line in Fig. 1, the tray mountings are loosened and the tray and agitator removed as above described.

Said drive shaft is itself driven by bevel gearing 35 housed on top of the tray enclosure 12. Power may come from a belt drive or any other desired source through conventional reduction gearing 36 so that the shaft 25 makes about 5 R. P. M. This speed may, of course, be varied depending on the type of material being treated.

The detailed construction of a tray is best shown in Figs. 4, 5, 6 and 7. As above stated, the tray consists of an upper rimmed portion or pan 17 and a lower portion 16. Said upper portion fits on said lower portion, grooved joints and gaskets 37 helping to make a tight seal. The port or slot 22 passing through the tray forms a baffle so that when the hot gases enter by the inlet 18 they must circulate around inside the tray before leaving by the damper regulated port 20 and passing to the stack. The lower portion 16 of the tray is strengthened by means of ribs or fins 38 and braces 39.

The radial slot 22 in each of the said circular trays is, of course, offset in relation to the slot of the tray above in a direction opposite to the movement of the agitating means so that the material will be moved through substantially the complete circuit of each tray before dropping to the tray below. The same applies to the top tray 13 in relation to the charging opening in the top of the enclosure 12.

Illustrative of the reactions which may be carried out in the furnace of this invention is the production of granular sodium orthosilicate from substantially anhydrous (granular) caustic soda and silica. The reactant materials are intimately mixed and continuously fed to the furnace by a feed conveyor (not shown), dropping into enclosure 12 and onto tray 13 where they are preheated substantially up to reaction temperature. The agitators 26 gradually and continuously move the materials about said uppermost tray until they are discharged through slot 22 to tray 14 below which is maintained at the desired reaction temperature. The reaction products then drop to tray 15 which is maintained at a temperature sufficient to drive off undesired moisture, one of the products of this reaction. The hot product next drops onto tray 24 outside the insulated enclosure 12 and is cooled by the water caused to circulate through the hollow portion of such tray as above described. The dry, cooled product is then continuously discharged from said last named tray ready to be crushed, sifted, packaged, or otherwise handled preparatory to use.

At the drying stage on tray 15 the water vapor driven off is drawn through outlet ducts 40, 41, chamber 42, and thence to the stack. The damper 43 aids in regulating the draught from the stack drawing the heated gases through the trays. No forced draft is required.

The secondary air which passes between the outer wall and brick lining of chamber 1 on its way to the ports 7 is, of course, thus preheated and serves to cool the furnace wall.

In a preferred embodiment of the above described process a mixture of crystalline anhydrous caustic soda, silica flour and soda ash is employed. These materials are stored in separate bins and fed automatically to a mixer. The silica flour and caustic enter the mixer at the feed end and are thoroughly mixed in a dry state before the point of feed of the soda ash is reached. After the soda ash has been added the mixture is discharged into a conveyor which carries it to the furnace feed conveyor. There it may be joined by a stream of material returning from the final product screen which rejects all product that is too coarse or too fine in size. The product may generally be discharged from the cooling tray at a temperature of 230° F.

It is obvious, of course, that for certain reactions either the drying or cooling tray, or both, may be dispensed with. However, as in the case of the above example, the combination above described may be employed to transform a batch process to one continuous from raw material to finished product. Also, the heating of the material at the various stages has been accomplished without such material coming into contact with the products of combustion and a precise regulation of the temperature at each of such stages has been achieved.

Other modes of applying the principle of my invention may be employed instead of the one explained, change being made as regards the mechanism herein disclosed, provided the means stated by any of the following claims or the equivalent of such stated means be employed.

We, therefore, particularly point out and distinctly claim as our invention:

1. A tray for use in a chemical reaction furnace and the like, comprising a hollow lower portion, a rimmed upper portion, adjacent inlet and outlet ports to said hollow portion, and an enclosed radially disposed passageway through such tray between said ports, the walls of said passageway forming a baffle wall between said ports.

2. In combination, for use in a chemical reaction furnace or the like, a circular rimmed tray and a material agitating device supported thereby, said device comprising a hub, arms extending radially from said hub, a plurality of blades carried by each of said arms adapted to rest on said tray, means for adjusting said blades to a desired angle of inclination to said arms, and material leveling means carried by said arms on the trailing side thereof.

3. In a chemical reaction furnace, the combination of a fuel combustion chamber, a series of vertically disposed trays comprising a hollow lower portion and a rimmed upper portion, inlet ports to said hollow portions from said combustion chamber, outlet ports from said hollow portions adjacent said inlet ports, enclosed radially disposed passageways through said trays between said inlet and outlet ports, the walls of said passageways forming baffle walls between said ports, damper means for individually regulating the flow of hot gases from said combustion chamber through said hollow lower portions of said trays, a withdrawable, rotatable, vertically mounted shaft passing centrally through said trays, material agitating means supported on each of said trays and axially slidably connected to said shaft for rotation therewith, and means for rotating said shaft.

HOWARD RODERICK.
ARTHUR C. SCHUBRING.